(12) United States Patent
Noordam et al.

(10) Patent No.: US 11,925,156 B2
(45) Date of Patent: *Mar. 12, 2024

(54) GROOVED STACKABLE PANEL FOR FLOATING CULTIVATION OF PLANTS

(71) Applicant: CULTIVATION SYSTEMS B.V., The Hague (NL)

(72) Inventors: Christiaan Silvester Noordam, Schipluiden (NL); Maurice Cornelis Antonius Van Der Knaap, The Hague (NL)

(73) Assignee: CULTIVATION SYSTEMS B.V., The Hague (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,936

(22) Filed: Jan. 23, 2023

(65) Prior Publication Data

US 2023/0157222 A1 May 25, 2023

Related U.S. Application Data

(63) Continuation of application No. 16/472,763, filed as application No. PCT/NL2017/050855 on Dec. 19, 2017, now Pat. No. 11,606,916.

(30) Foreign Application Priority Data

Dec. 23, 2016 (NL) ...................................... 2018075

(51) Int. Cl.
*A01G 9/28* (2018.01)
*B63B 35/44* (2006.01)
*A01G 9/08* (2006.01)

(52) U.S. Cl.
CPC ............... *A01G 9/28* (2018.02); *B63B 35/44* (2013.01); *A01G 9/081* (2013.01); *A01G 9/085* (2013.01); *B63B 2035/4493* (2013.01)

(58) Field of Classification Search
CPC .......... A01G 9/28; A01G 9/081; A01G 9/085; A01G 9/08
See application file for complete search history.

(56) References Cited

U.S. PATENT DOCUMENTS

| 4,355,484 A | 10/1982 | Mandish |
| 2008/0120903 A1 | 5/2008 | Fair et al. |
| 2015/0373935 A1 | 12/2015 | Anderson et al. |

FOREIGN PATENT DOCUMENTS

| AU | 491974 B2 | 9/1976 |
| CN | 202565840 U | 12/2012 |

(Continued)

OTHER PUBLICATIONS

International search report (ISR), dated Mar. 16, 2018, from corresponding international application No. PCT/NL2017/050855.

(Continued)

*Primary Examiner* — Monica L Perry
*Assistant Examiner* — Aaron M Rodziwica
(74) *Attorney, Agent, or Firm* — NIXON & VANDERHYE

(57) ABSTRACT

Panel for floating cultivation of plants on water, includes parallel grooves at a top side extending longitudinally, adapted for receiving a substrate and a number of plants or precursors in the substrate, each groove extending through the panel from a first top plane to a second parallel plane. The panel includes air chambers at a lower side extending substantially below the second plane, each of the air chambers allowing therein formation of air roots of plants supported in the substrate of the grooves. At the second plane, each groove is spaced apart from the circumferential side wall of the air chamber it debouches in when projected onto a plane normal to the longitudinal direction, each of the grooves including at least two side support surfaces extending parallel to the groove and below the top side, the side (Continued)

Figure 1B:
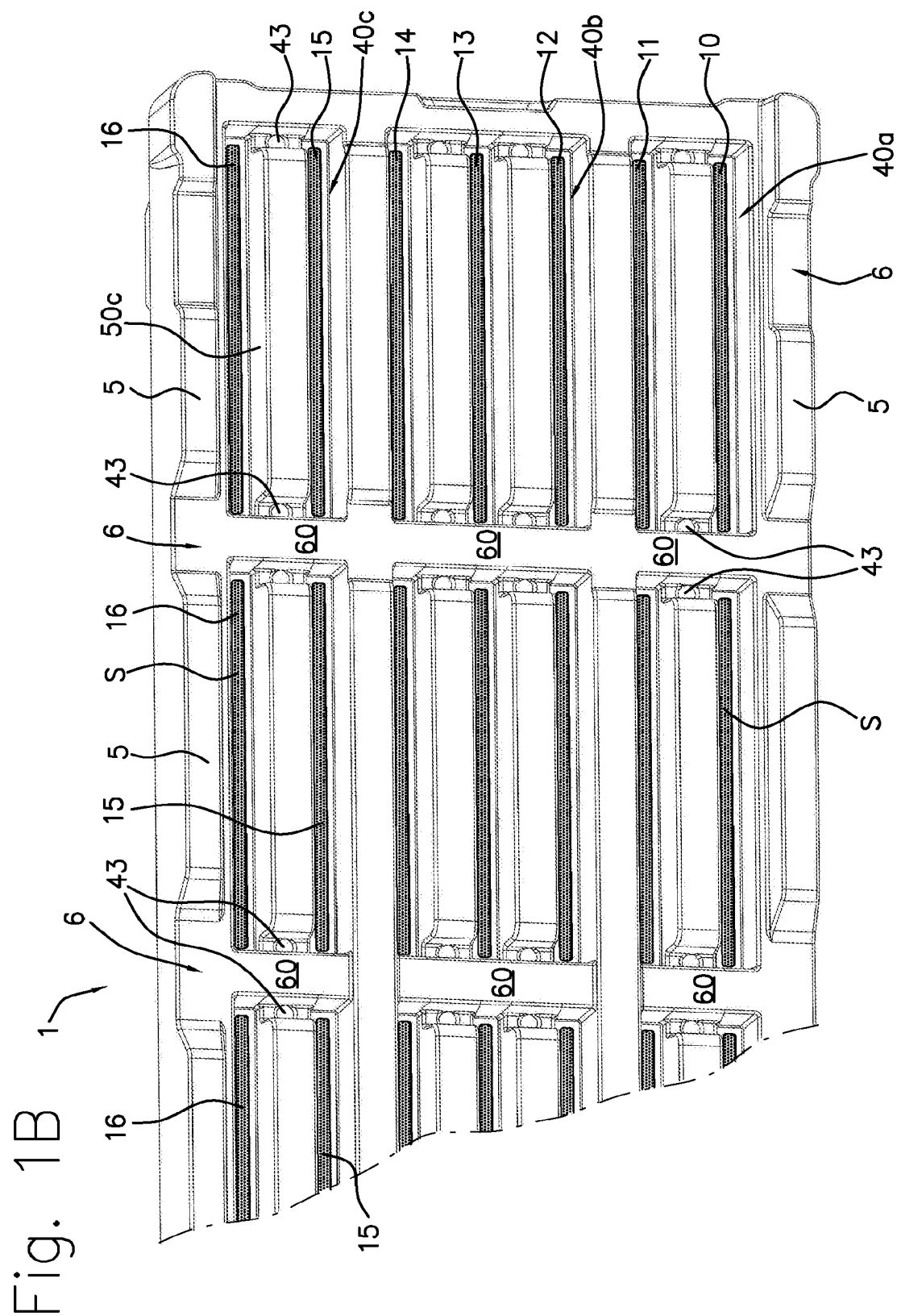

support surfaces adapted for substantially completely supporting the substrate in the groove.

28 Claims, 10 Drawing Sheets

(56) References Cited

FOREIGN PATENT DOCUMENTS

| | | | |
|---|---|---|---|
| CN | 208016583 U | | 10/2018 |
| CN | 208016583 U | * | 10/2018 |
| EP | 1 213 955 B1 | | 6/2003 |
| GB | 1053508 A | * | 1/1967 |
| GB | 1053508 A | | 1/1967 |
| IT | 20130042 A1 | | 9/2014 |
| JP | H02-13333 A | | 1/1990 |
| JP | 109275829 A | | 10/1997 |
| JP | H10155378 A | | 6/1998 |
| JP | 2004-344088 A | | 12/2004 |
| JP | 2019-4810 A | | 1/2019 |
| JP | 2019004810 A | * | 1/2019 |
| JP | 2019-33674 A | | 3/2019 |
| JP | 2019-33717 A | | 3/2019 |
| JP | 2019033674 A | * | 3/2019 |
| JP | 2019033717 A | * | 3/2019 |
| JP | 2019-106937 A | | 7/2019 |
| JP | 2019106937 A | * | 7/2019 |
| KR | 10-2018-0109870 A | | 10/2018 |
| KR | 20180109870 A | * | 10/2018 |
| RU | 2 529 314 C2 | | 9/2014 |
| WO | 01/22800 A2 | | 4/2001 |
| WO | 2012/172187 A1 | | 12/2012 |
| WO | 2014/122292 A1 | | 8/2014 |

OTHER PUBLICATIONS

Office Action issued in Chinese Patent Application No. 201780084723.6 dated Mar. 12, 2021.

* cited by examiner

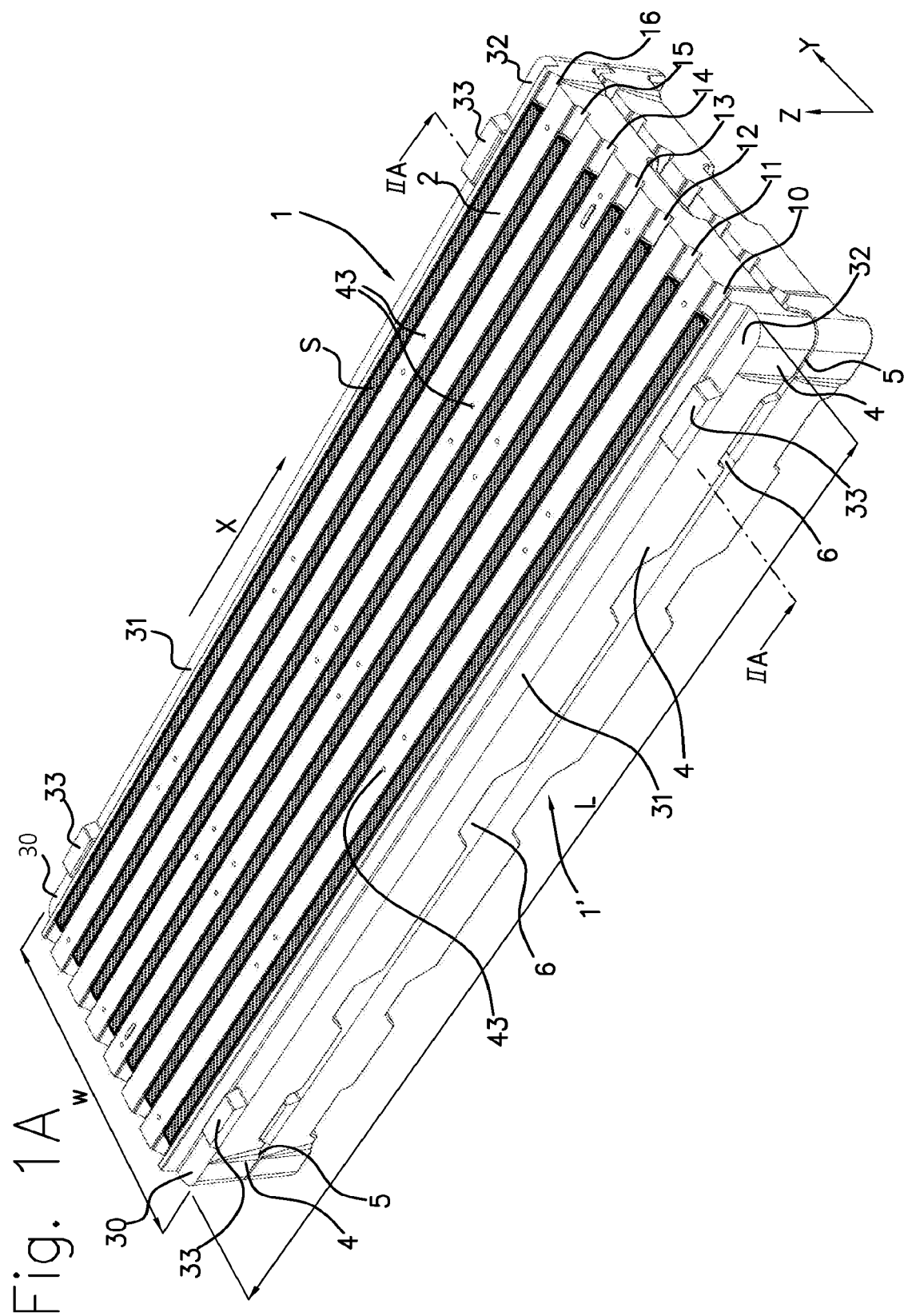

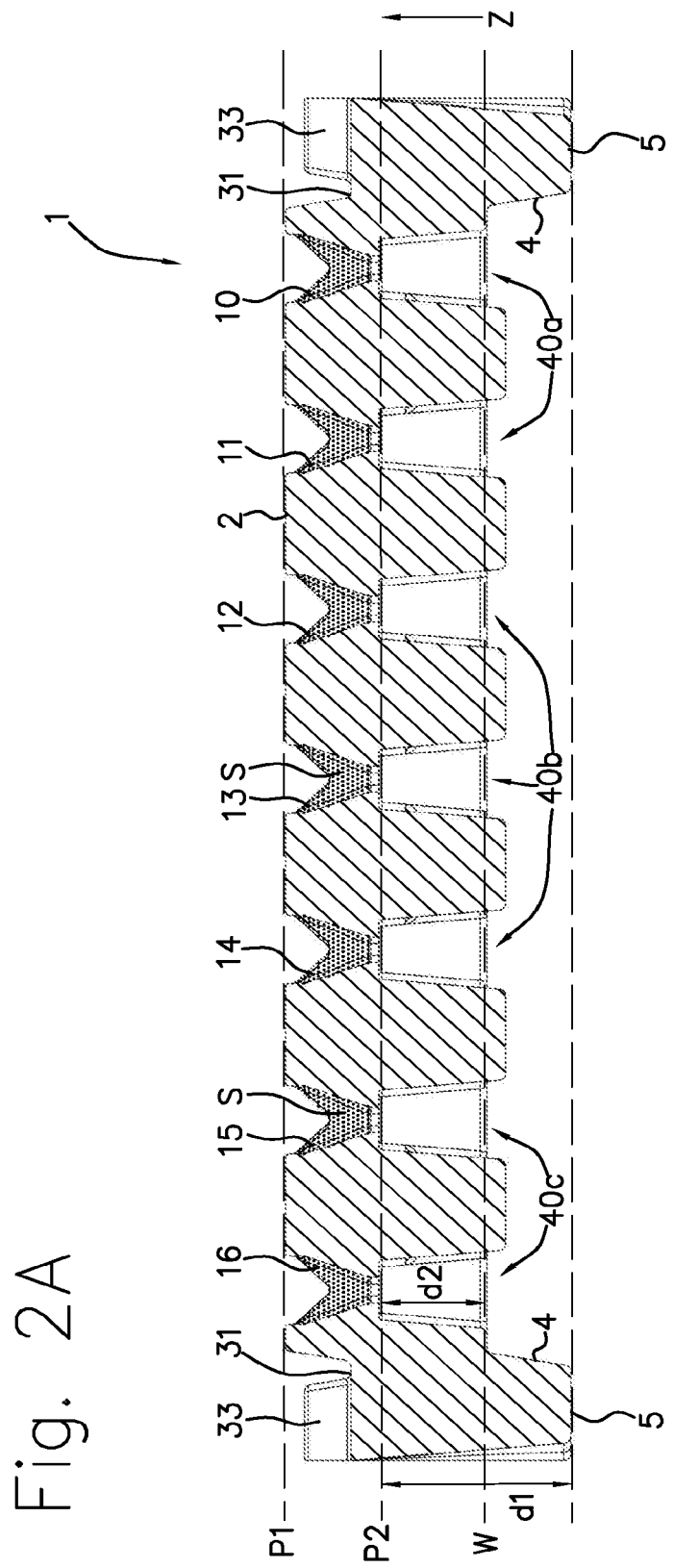

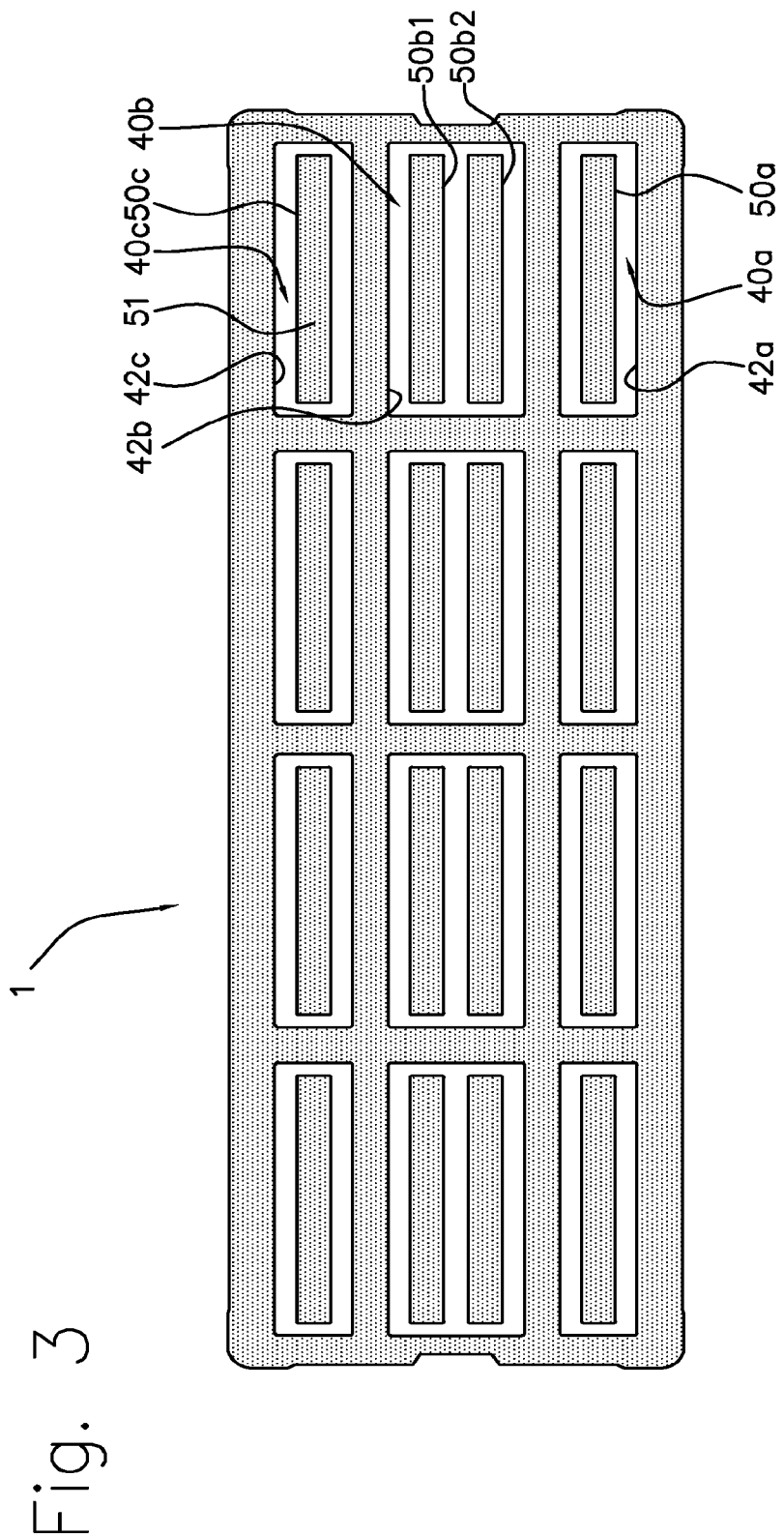

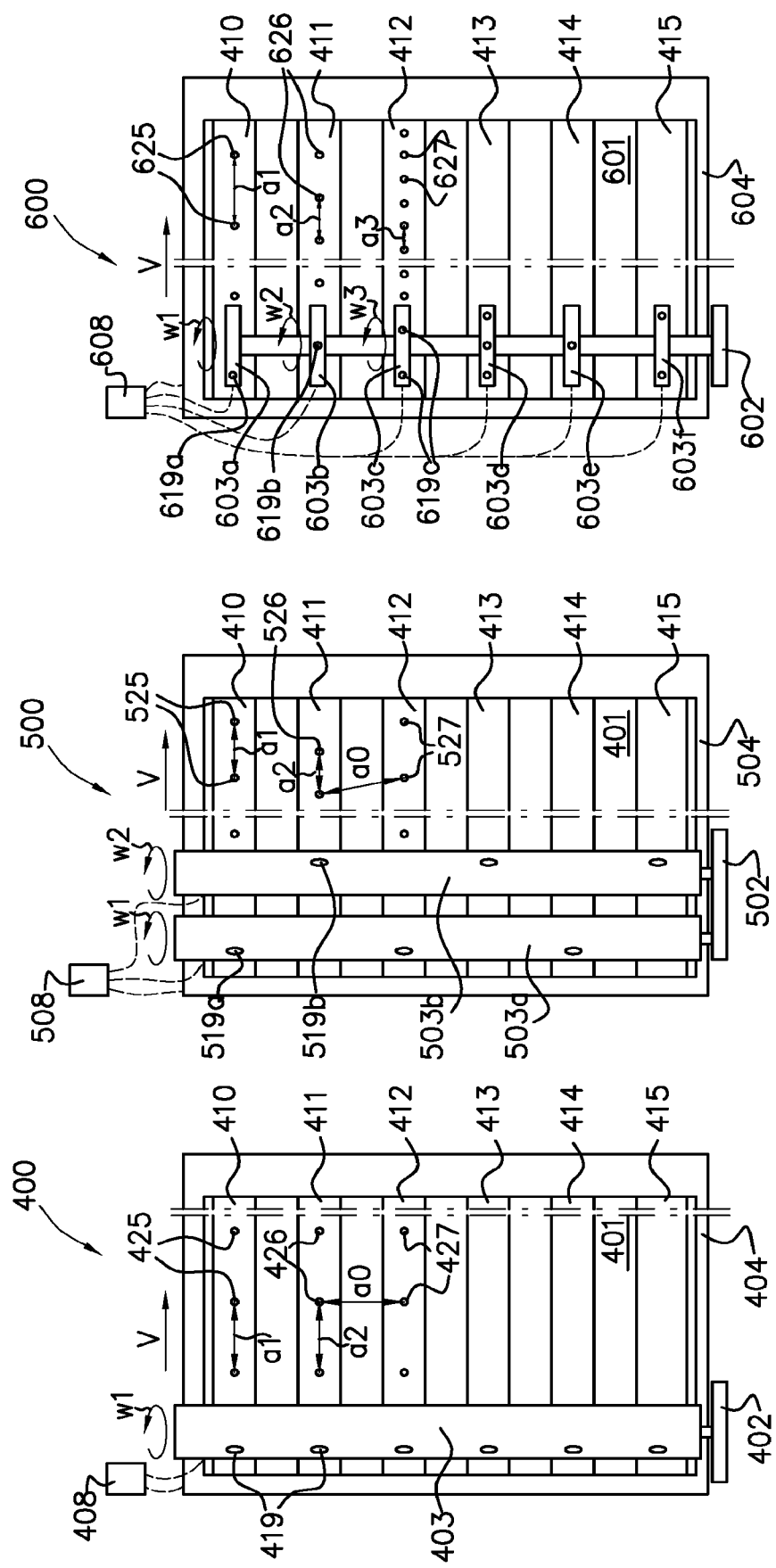

GROOVED STACKABLE PANEL FOR FLOATING CULTIVATION OF PLANTS

CROSS REFERENCE TO RELATED APPLICATIONS

This application is a Continuation of copending application Ser. No. 16/472,763, filed on Jun. 21, 2019, which is the National Phase under 35 U.S.C. § 371 of International Application No. PCT/NL2017/050855, filed on Dec. 19, 2017, which claims the benefit under 35 U.S.C. § 119(a) to Patent Application No. 2018075, filed in the Netherlands on Dec. 23, 2016, all of which are hereby expressly incorporated by reference into the present application.

FIELD OF THE INVENTION

The present invention relates to a stackable panel for floating cultivation of plants on water, said panel comprising a plurality of parallel grooves at a top side of said panel which extend in a longitudinal direction of the panel and are adapted for receiving therein a substrate and a number of plants or precursors thereof in the substrate, wherein at said top side the length of each groove is at least 10 times the width of the groove, each groove extending through the panel from a first plane at said top side to a second plane parallel to and spaced apart from said first plane. The invention further relates to a system and method for filling such a panel with substrate and plants or the precursors thereof.

BACKGROUND ART

Such a panel is known from Japanese patent publication JPH10155378A, which describes a cultivation panel, e.g. made from foamed polystyrene, with side parts between which a meshed net is provided in a recessed part of the panel. When a strip of tape with seedlings is arranged in the recess and supported on the net, roots of the seedlings can grow through the meshes, through a layer of air and towards a water surface on which the panel floats. A number of such cultivation panels can be inserted in parallel in respective insertion parts of a spacer panel. During growth of plants from the seedlings the space between cultivation panels can be increased by transferring the cultivation panels another spacer panel in which the insertion parts are spaced further apart from each other.

A drawback of this conventional panel is that the roots of the plants become tangled in the net, requiring additional work during harvesting of the grown plants and when cleaning the panel for re-use. Moreover, roots can cling to the side parts of the cultivation panel below the meshed net, effective acting as a wick which transports water from the water surface along the side portions and to the strip in the recess. This hinders the formation of air roots and may cause rot in the plants. It is an object of the present invention to provide a panel, system and method in which these drawbacks are at least partially overcome.

SUMMARY OF THE INVENTION

To this end, according to a first aspect, the invention provides a stackable panel for floating cultivation of plants on water, said panel comprising a plurality of parallel grooves at a top side of said panel which extend in a longitudinal direction of the panel and are adapted for receiving therein a substrate and a number of plants or precursors thereof in the substrate, wherein at said top side the length of each groove is at least 10 times the width of the groove, each groove extending through the panel from a first plane at said top side to a second plane parallel to and spaced apart from said first plane, wherein the panel comprises a plurality of air chambers at its lower side which extend substantially below the second plane, each of said air chambers arranged to allow therein the formation of air roots of plants or precursors thereof which are supported in the substrate of one or more of said grooves, each of said chambers comprising a ceiling into which one or more of said grooves debouch and merging into a circumferential side wall delimiting said chamber from the other air chambers and having a circumferential bottom edge arranged for extending into the water when the panel floats on the water, wherein, at said second plane, each groove is spaced apart from the circumferential side wall of the air chamber it debouches in when seen in projection onto a plane normal to the longitudinal direction, each of said grooves comprising at least two side support surfaces which extend parallel to the groove and below the top side, said side support surfaces adapted for substantially completely supporting the substrate in the groove. The side support surfaces preferably are closed surfaces and typically are an integral part of the panel. The roots of plants or precursors thereof cannot become tangled with the side support surfaces and can hang straight from the substrate down into the water. As each groove is spaced apart from the circumferential side wall of the air chamber it debouches in, the roots of a plant or precursor thereof do not grow on the circumferential side wall but remain spaced apart therefrom. Rotting of the roots due to constant contact thereof with water which adheres to the wall due to capillary action is avoided, and strong air roots can grow from the second plane down to the water surface.

The circumferential bottom edge is preferably adapted for extending, e.g. between slightly into the water when the panel floats on the water so as not to substantially inhibit flow of water into and out of the chambers. The water in each chamber may thus be prevented from becoming stagnant. At the same time flow of air through or under the circumferential side wall of the chambers is prevented.

In an embodiment said side support surfaces are facing side support surfaces which taper towards each other in a direction from the first plane towards the second plane. Though side support surfaces may merge into the top side, preferably between the top side and the two side support surfaces two corresponding walls are provided which are parallel to the longitudinal direction and substantially normal to the first plane.

In an embodiment each of said air chambers is arranged for receiving therein air roots from plants or precursors thereof which are supported in the substrate of two or more of said grooves. Plants or precursors thereof which are supported in different grooves which debouch in a same air chamber.

In an embodiment within each air chamber an inner circumferential wall is arranged which extends from the ceiling and is spaced apart from said circumferential side wall of the air chamber.

In an embodiment each of said grooves having a width of between 0.3 cm and 3 cm Preferably at the top side the grooves have a width of between 1.5 cm and 3 cm and at the point where they debouch into their air chamber have a width of between 0.25 and 0.5 cm.

In an embodiment said side support surfaces face each other and each extend from just below the first plane substantially to the second plane.

In an embodiment said grooves are adapted for directly receiving therein the substrate and the plants or precursors thereof.

In an embodiment the grooves are adapted to be substantially completely filled by the substrate and the number or plants or precursors in the substrate.

In an embodiment said circumferential side wall is substantially air-tight and merges into said ceiling, the ceiling comprising an opening spaced apart from the groove and adapted for the passage of air between the top side and the chamber. At the top side of the panel the opening preferably debouches between two grooves. When two or more grooves debouch into a same air chamber, e.g. as described earlier herein, the opening can extend substantially normal to the first plane, from the top side of the panel and into to chamber.

In an embodiment the panel is provided at a lower side with legs which each have a distal end adapted for being partially submerged in the water at a first distance from said second plane in a direction normal to said second plane.

In an embodiment said circumferential side wall has a circumferential distal edge at a second distance from said second plane in a direction normal to said second plane, wherein said second distance is smaller than said first distance.

In an embodiment said panel, at said top side and below said first plane, comprises stacking surfaces adapted for supporting thereon legs of a further panel of a same construction, wherein said stacking surfaces merge into ramps which project further towards said first plane than the support surfaces. Preferably the stacking surfaces are substantially planar and extend parallel to the first plane and wherein said ramps, at least at the position where they merge into the stacking surfaces, extend at an angle to the stacking surfaces. Generally the panel will comprise a first stacking surface and a second stacking surface both extending substantially parallel to said grooves and wherein, when seen in projection onto said first plane, the grooves are all arranged between the first and second stacking surface.

In an embodiment said grooves, at least at the top side of the panel, extend over the entire length of the panel.

In an embodiment the legs comprise openings and/or recessed portions for allowing, when the panel is stacked on another panel of a same construction, air to flow through said openings and/or said recessed portions into and out of the air chambers of the panel which is stacked on said another panel.

In an embodiment said plurality of grooves is arranged to allow compression of the substrate therein by moving a single cylindrical roller across said top side along the longitudinal direction.

In an embodiment the panel comprises a top part which comprises the top side and the side support surfaces of the grooves, wherein the top side and side support surfaces, and any portions of the top part between the top side and the side support surfaces are substantially impermeable to air and water; the panel further comprising a bottom part connected to said top part and comprising the circumferential side walls of the air chambers, wherein the density of the bottom part is at least 1,5 times less than the density of the top part. For instance, the top part may be substantially made from, or comprise, a relatively high density material, such polyethylene or polypropylene, and the bottom part may be made from or comprise a lower density material, e.g. an expanded foam such as expanded polystyrene (EPS), expanded polypropylene (EPP), expanded polyolefin (EPO), expanded polyethylene (EPE) foam, or polyurethane. The air- and water tightness of the top part ensures that humidity cannot travel through the top part to the top side where it might come into contact with a plant. As the lower part does not come into contact with the plants or precursors thereof, this part does not have to be watertight. The lower density of the bottom part provides additional buoyancy to the panel. Preferably, the top part further comprises the ceilings of the air chambers, to ensure that the ceilings are substantially impermeable to water.

Though the top part and bottom part may be permanently fixed to each other, e.g. by gluing or welding, this is not a requirement. In an embodiment, the top part and bottom part are detachably connected to each other, preferably in a manner such that when the top part is mounted on the bottom part, it can be detached from the bottom part by moving the top part away from the bottom part in a direction normal to the first plane, and such that movement of the top part relative to the bottom part in a direction parallel to the first plane is substantially prevented. For instance, the bottom part may comprise one or more pins which project from a top side of the bottom part in a direction normal to the second plane, and the top part may comprise one or more corresponding sockets in a bottom side of the top part, for receiving the pin or pins, or vice versa. After a panel has been used for cultivating plants, the top part may thus be detached from the bottom part to be cleaned.

In an embodiment, the top side, the side support surfaces of the grooves, and any portions of the panel between the top side and the side support surfaces, are completely coated with a coating that is impermeable to air and water. Humidity is thus prevented from passing through the coating from below the top side to portions of a plant, such as leafs, that are supported on the top side, where the humidity might cause those plant portions to rot.

In an embodiment the panel is substantially completely coated with a coating that is impermeable to air and water. The entire panel can thus easily be cleaned. The coating can be applied to the panel for instance by spraying the coating on the panel, or by submerging surfaces of the panel that are to be coated in a basin containing liquid coating.

In an embodiment a plane normal to the first plane extends between the two side support surfaces of each groove and parallel to the groove, wherein an inner angle between each of said side support surfaces and said plane is in a range of 60 to 80 degrees, preferably in a range of 70 to 75 degrees. The resulting relatively narrow grooves help ensure that the greatest portion of the roots of a plant are formed in the air chamber rather than in the substrate in a groove.

In an embodiment, the ceiling of each air chamber, at least in the vicinity where a groove debouches in the air chamber, extends substantially within a plane at an angle in the range of 0 to 20 degrees to the second plane. It is preferred that the ceilings extends substantially parallel to the first and second plane, as this greatly facilitates manufacture of the panel.

According to a second aspect, the present invention provides a system for placing plants or the precursors thereof in a panel according to any one of the preceding claims, comprising:
 a frame;
 a conveyor, attached to said frame and adapted for moving the panel in the longitudinal direction thereof relative to the frame,
 a metering device for plants or the precursors thereof, mounted on the frame and arranged above the conveyor, wherein said metering device is adapted for dispensing said plants or the precursors thereof in the grooves of said panel during movement of the panel relative to the frame. As during metering the panel is moved along its longitudinal direction, the distance at which plants or precursors thereof are dispensed into the grooves can be varied in a continuous manner.

In an embodiment the system further comprises a substrate dispensing device adapted for filling said grooves of the panel with soil from the top side of the panel. The substrate may comprise soil and/or a growth medium for the plants.

In an embodiment the system further comprises a template on which the panel is to be placed during filling of the grooves, said template comprising protrusions for substantially closing off a bottom side of said grooves to prevent substrate from falling through the grooves during said filling.

In an embodiment the system further comprises a compacting device for pressing down on the substrate in the grooves when the grooves have been filled with substrate. Preferably said compacting device is pressed down on the substrate in while the panel is still placed on said template, with the protrusions substantially closing off the bottom side of said grooves.

In an embodiment the system further comprises a cover template adapted for substantially covering the top side of the panel except for the grooves thereof during filing of the grooves with substrate, wherein at least during said filling, the cover template is arranged below the substrate dispensing device. The cover device may comprise a substantially planar surface in which slits are provided at locations corresponding to the grooves of a panel which the cover template is to cover, the slits extending over the entire lengths of the grooves and having a width substantially equal to the width of the grooves at the top side of the panel. The cover template is preferably spaced apart from the top side of the panel, e.g. by a distance of between 1 and 8 cm, so that the panel may easily be moved away from under the cover template once the grooves have been filled with substrate. Preferably, the cover template is arranged, or fixed, at a position below the substrate dispensing device, and a slide or transporter is provided below the cover template for allowing the panel to be moved under the cover template in such a manner that substrate from the substrate dispensing device can fall into the grooves of the panel substantially without falling onto the top side of the panel. Preferably the slits of the cover template have a length equal to the length of the grooves so that the grooves may be filled without having to move the panel relative to the cover template during filling. If the length of the slits is smaller, e.g. half the length of the grooves or less, the grooves may be filled with substrate along their entire length, by moving the panel along its longitudinal direction relative to the cover template and the substrate dispensing device during filling.

In an embodiment the metering device is at configurable to dispense plants or the precursors thereof at an adjustable rate, in order to dispense plants or precursors at corresponding adjustable distances from each other in a groove of a panel. The system allows the number of plants or precursors thereof that is placed in a groove of a panel to be adjusted. The same panel can thus be used for cultivating plants at different distances from each other. For instance the number of plants or precursors thereof can be adjusted between 4 and 24 plants per groove. The timing and rate for dispensing may be adjusted per groove. For instance, within each groove plants or precursors thereof may be dispensed at a rate so that within a groove they are spaced at a first distance from each other parallel to the longitudinal direction. The timing for dispensing plants or precursors thereof between two adjacent grooves may be delayed in order also adjust the closest distance between plants or precursors thereof in the adjacent grooves.

In an embodiment the grooves of the panel are partitioned into two or more sets of grooves, and the rate of dispensing of the metering device is individually configurable for each set of grooves. Each set of grooves may consists of one or more than one groove, preferably with at least two grooves being partitioned into a same set. The rate at which plants or precursors thereof are dispensed to grooves of one set of grooves while a panel is moved under the metering device along the longitudinal direction of the grooves can thus be different from the rate at which plants or precursors thereof are dispensed to grooves of one or more other sets of grooves. Within a set of grooves the dispensing rate is the same.

In an embodiment the metering device comprises a multiple dispensing units, each unit adapted for dispensing plants or the precursors thereof in the grooves of one the sets, wherein the dispensing rate for each of unit can be set independent of the dispensing rates of the other units, the system further comprising a controller adapted for individually controlling the dispensing rate of each of the dispensing units. The metering device is thus adapted to vary distances between plants or precursors within a groove, as well as to vary distance between plants or precursors thereof in neighboring grooves. In an embodiment, the rate of dispensing of the metering device is individually configurable for each groove.

In an embodiment, a time offset at which the metering device dispenses a plant or precursor thereof is individually configurable for each groove. For instance, if the dispensing rate for all grooves is equal, then by adjusting the time offset at which the plants or precursors thereof are deposited in for each groove, the closest distance between plants or precursors thereof deposited in neighboring grooves can be adjusted. E.g. if in each groove a plant or precursor thereof is deposited each second, while the panel moves at a speed of 12 cm per second, then in a first groove a plant or precursor may be depositing at time 0, 1, 2, . . . and 11 seconds, while in a neighboring groove a plant or precursor may be depositing at time 0.5, 1.5, 2.5, . . . and 11.5 seconds.

In an embodiment, the controller is further adapted for setting, for each of the dispensing units, an initial position along the length of the panel where a plant or precursor thereof is be deposited. Thus, the plants or precursors thereof in grooves of a set can be deposited out of phase along the length of the panel with respect to grooves of one or more of the other sets. This allows the distance between plants or precursors thereof in neighboring grooves to be set at variable distances.

In an embodiment the metering device comprises a dispensing unit which is mounted to said frame to be rotatable around an axis of rotation that is perpendicular to the longitudinal direction and parallel to said first plane, wherein said rate is adjustable by adjusting the speed of rotation of said dispensing unit. The metering device may further comprise a motor for driving rotation of the dispensing unit at an adjustable speed in order to dispense said seeds at a corresponding adjustable rate. Preferably, the dispensing unit comprises a hollow cylinder adapted for holding seeds of said plants in an interior of said cylinder, wherein the cylinder is provided with a through opening from said interior to an exterior surface of the cylinder for dispensing one or more seeds therefrom.

In an embodiment the system further comprises a soil dispensing device, arranged upstream of said metering device in the direction of movement of the panel, and adapted for continuously filling said grooves with soil when said panel is moved under the soil dispensing device. This soil, or other substrate, can thus be efficiently deposited in the grooves of the panel as the panel is moved underneath the dispensing device.

In an embodiment the system further comprises removable cover plates adapted for covering the stacking surfaces and the ramps of the panel during filling thereof with soil, said cover plates having a planar top surface such that, when the cover plates cover the stacking surfaces and ramps of a panel, the planar top surfaces are substantially flush with the top surface of the panel. The cover plates substantially prevent soil from adhering to the stacking surfaces and ramps during filling of the grooves with soil. The cover plates are removed before the panel is placed on the water. Thus, once a panel has been provided with soil and plants or the precursors thereof and floats on the water, it is less likely to spill soil in the water.

In an embodiment the system further comprises a roller having a width substantially equal to the maximum distance between grooves of the panel, and adapted for making rolling contact with the soil dispensed by the dispensing device into the groove, in order to compact the soil. Generally, the roller will be substantially cylindrical.

According to a third aspect, the present invention provides a method of cultivating plants using two or more panels as described herein, said method comprising the steps of:

filling empty grooves of each panel with soil and plants or the precursors thereof;

subsequently arranging said panels on a body of water in order to allow the formation of air roots from the plants of precursors thereof in the air chambers of the panels; and after said air roots have reached the body of water, removing the panels from the body of water and stacking them on top of each other in such a manner that the plants or the precursors thereof arranged in the grooves of one of said two or more panels can germinate and partially extend into an air chamber of another panel of said two or more panels which is stacked directly on said one panel. The step of filling the grooves of each panel with plants or the precursors thereof is preferably carried out using one of the metering devices as described herein.

In an embodiment the grooves of the panel are partitioned into two or more disjoint sets of grooves, and the rate of dispensing of the metering device is individually configurable for each set of grooves, and wherein said step of filling the empty grooves of each panel with substrate and plants or the precursors thereof comprises:

filling the grooves of the panel with substrate; and while conveying the panel under a metering device along the longitudinal direction of the panel, said metering device comprising an individual dispensing unit for each set of the two or more sets of grooves, dispensing plants or precursors thereof in the grooves, wherein the dispensing rate at which a first of said dispensing units dispenses plants or precursors thereof in its associated grooves differs from the dispensing rate at which a different, second one of said dispensing units dispenses plants or precursors thereof in its associated grooves. In this manner, distances between plants or precursors in the grooves can be varies as desired.

In an embodiment the panels are arranged abutting each other along their longitudinal direction during said filling of the grooves with plants and the precursors thereof.

Preferably, the rate of each dispensing unit is individually controlled, e.g. based on a velocity with which the panel is conveyed under the metering device. Thus, even in case of a hold up of panels downstream of the metering device which prevents movement of the panel in its longitudinal direction, the distance between plants or precursors in each of the grooves may remain substantially constant.

According to a fourth aspect, the invention provides a panel for floating cultivation of plants on water, comprising a plurality of parallel grooves at a top side which extend in a longitudinal direction of the panel and are adapted for receiving therein a substrate and a number of plants or precursors thereof in the substrate, each groove extending through the panel from a first plane at said top side to a second plane parallel to and spaced apart from said first plane, wherein the panel comprises a plurality of air chambers at a lower side which extend substantially below the second plane, each of said air chambers arranged to allow therein the formation of air roots of plants or precursors thereof which are supported in the substrate of one or more of said grooves, wherein, at said second plane, each groove is spaced apart from the circumferential side wall of the air chamber it debouches in when seen in projection onto a plane normal to the longitudinal direction, each of said grooves comprising at least two side support surfaces which extend parallel to the groove and below the top side, said side support surfaces adapted for substantially completely supporting the substrate in the groove.

SHORT DESCRIPTION OF DRAWINGS

Figure 2B:
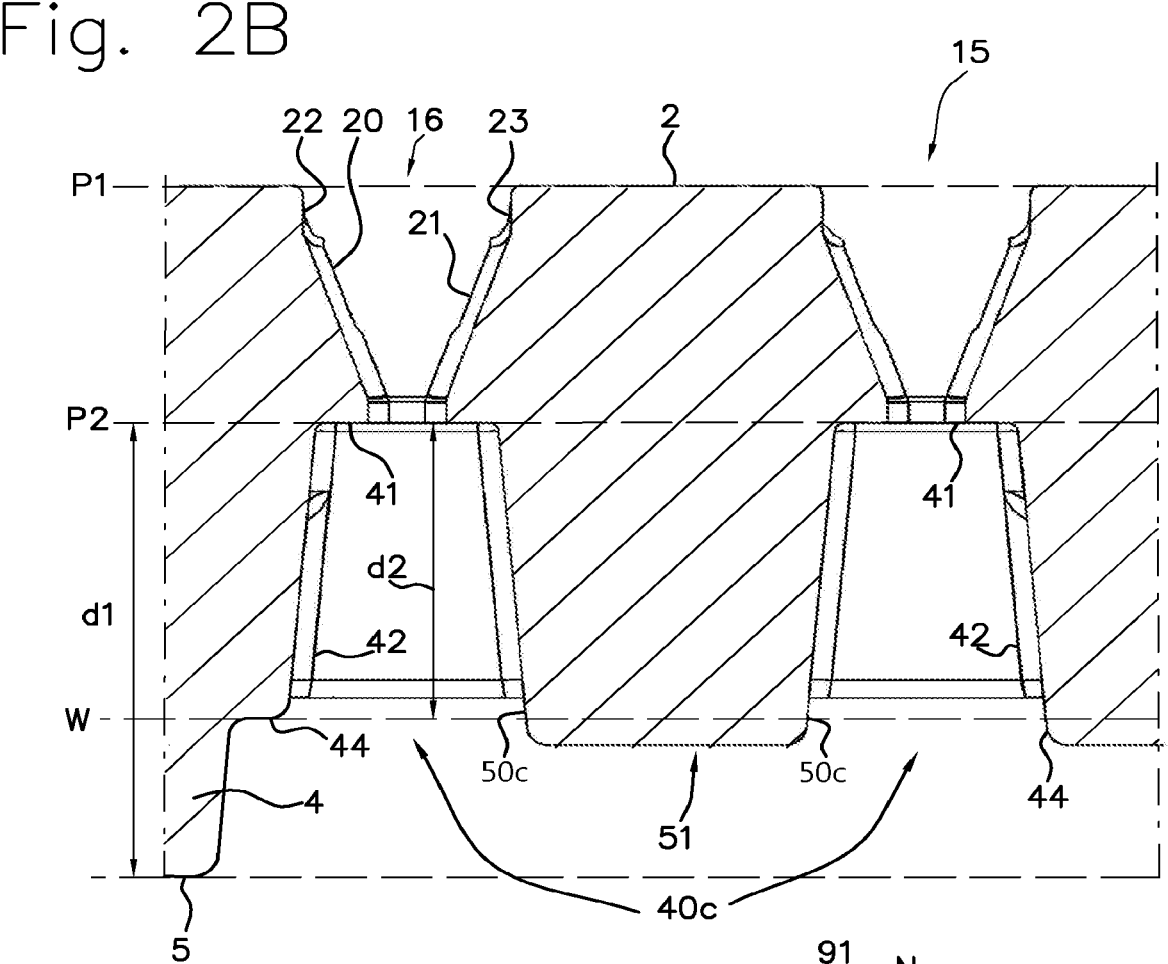
Figure 2C:
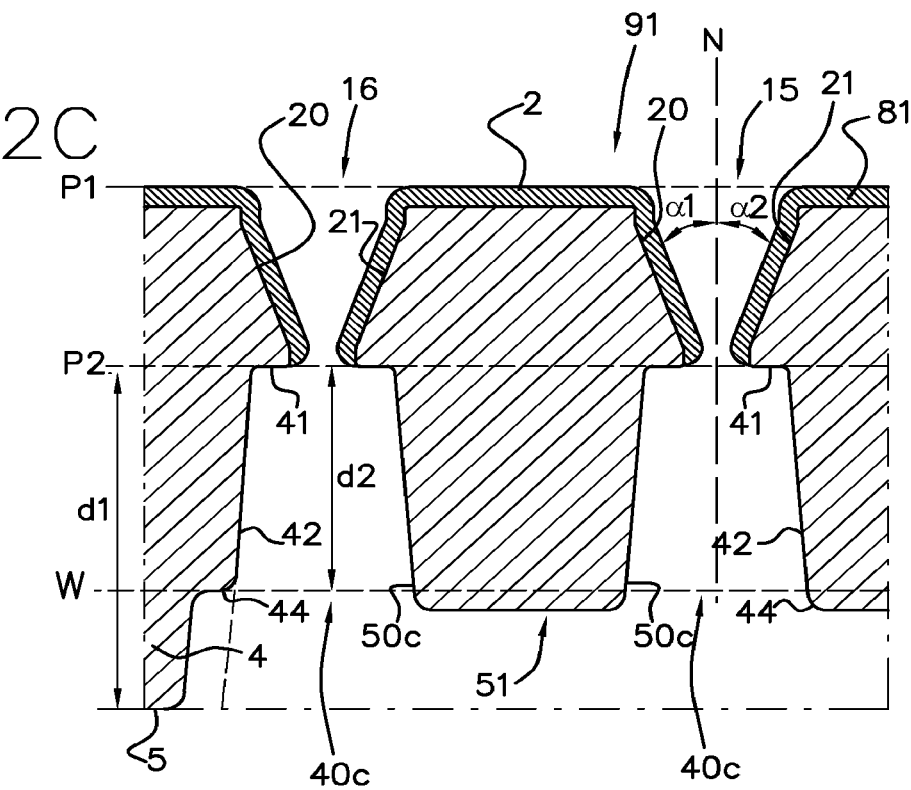
Figure 2D:
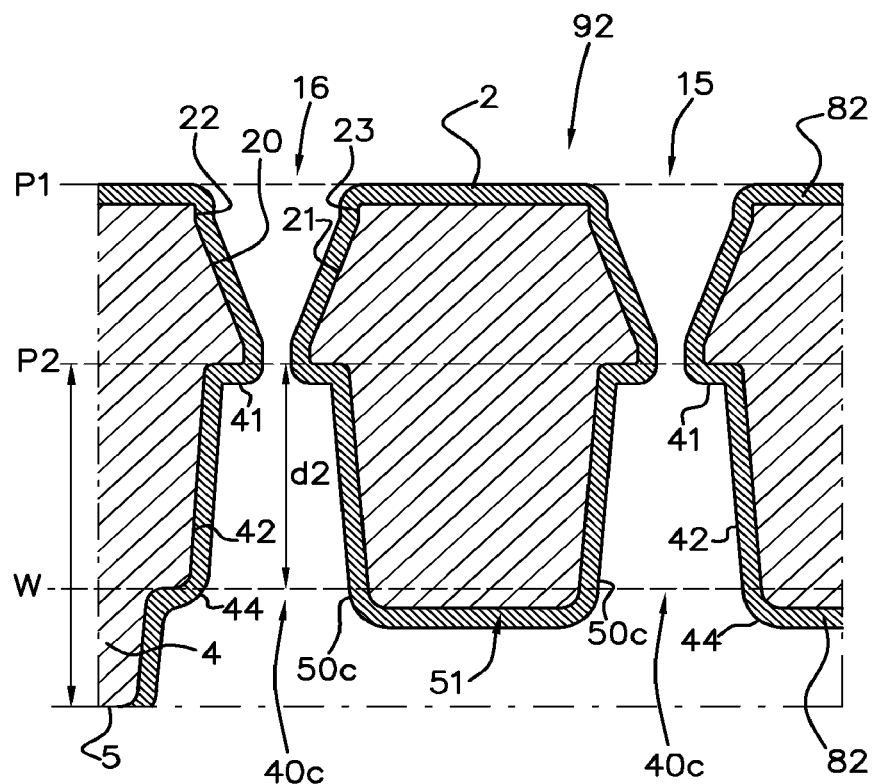
Figure 2E:
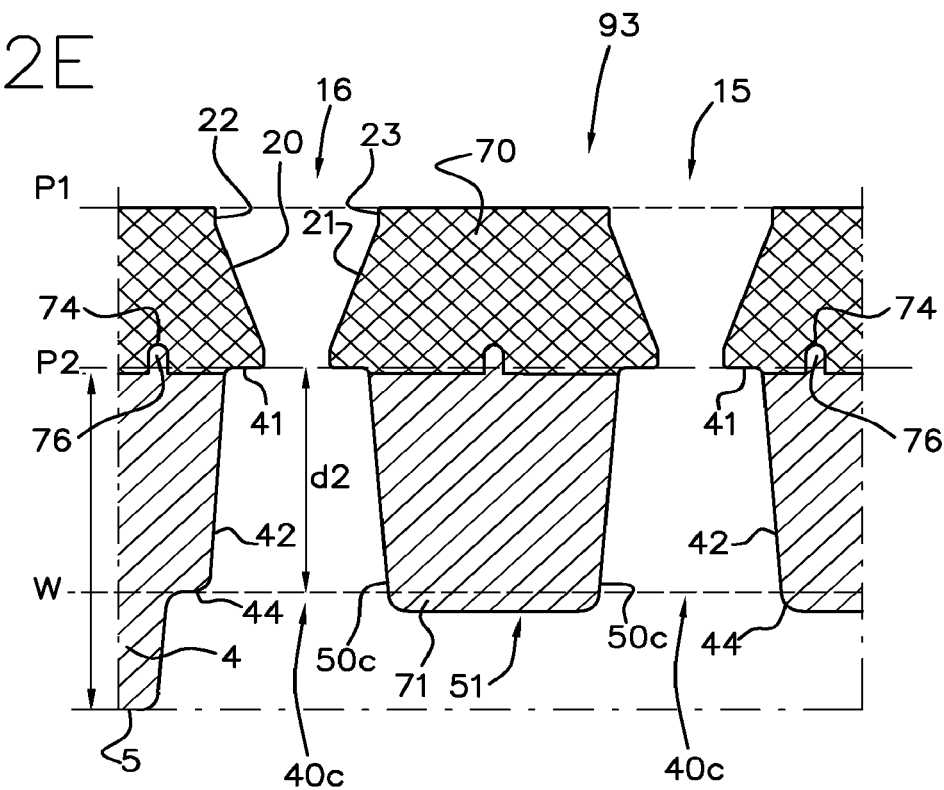
Figure 4:
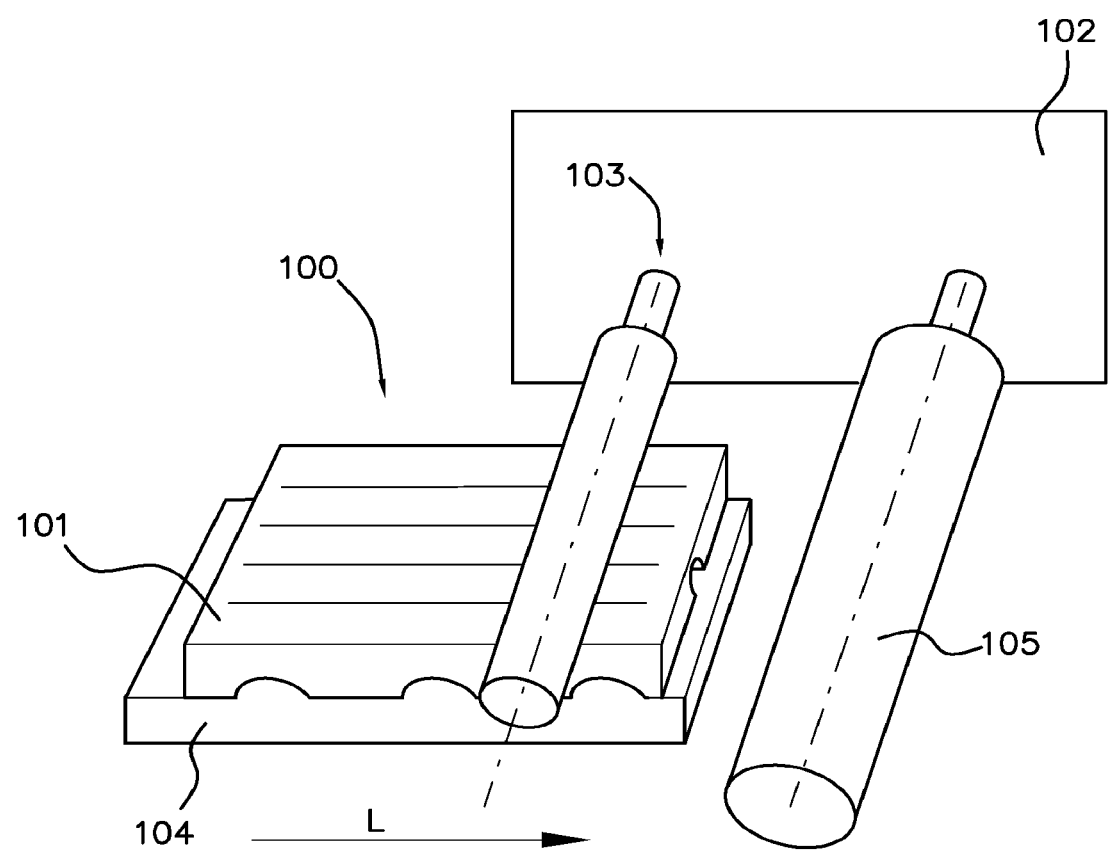
Figure 5:
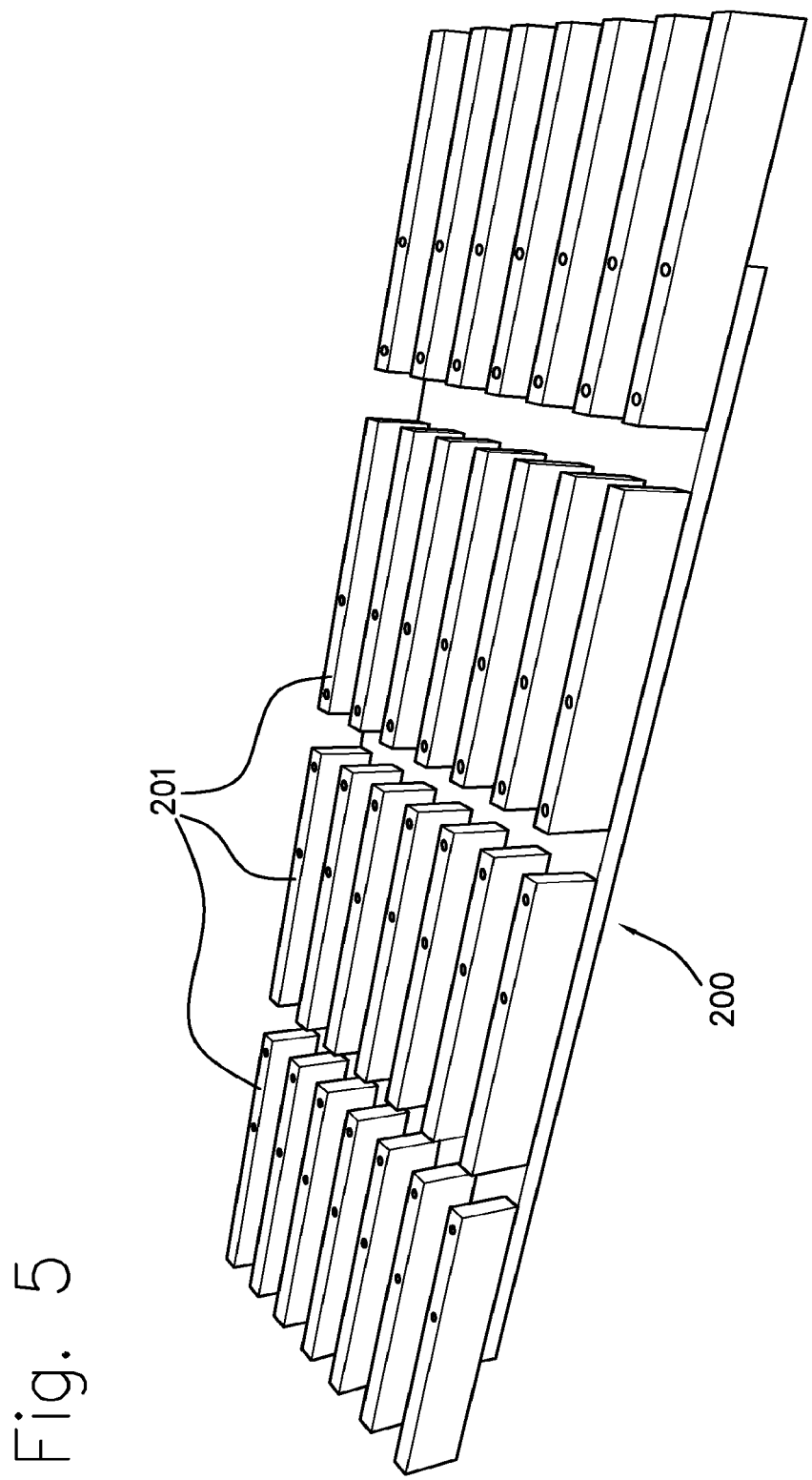
Figure 6:
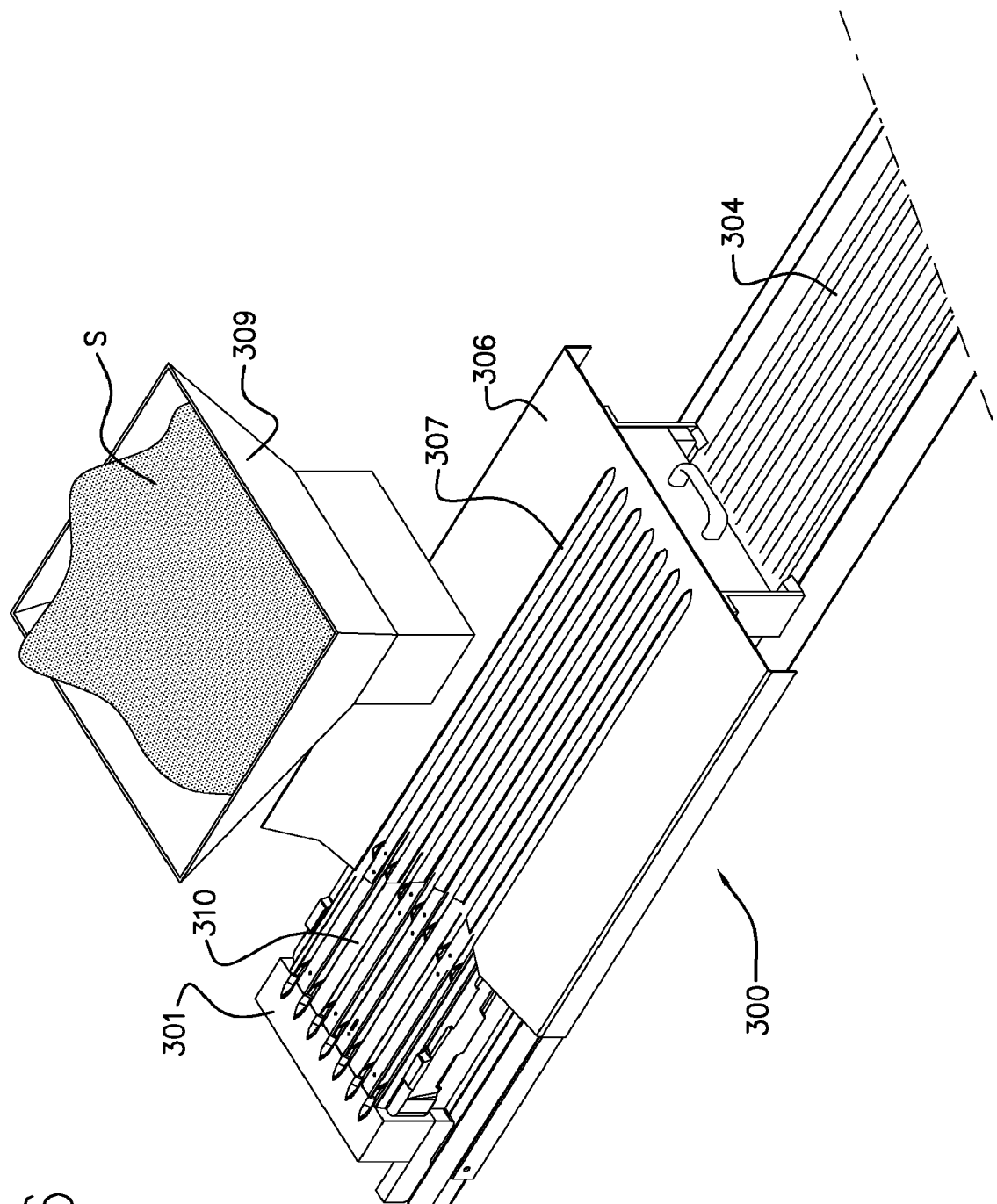

The present invention will be discussed in more detail below, with reference to the attached drawings, in which FIG. 1A shows two panels according to the present invention, stacked on top of each other;

FIG. 1B shows a partial bottom view of the panel of FIG. 1A;

FIGS. 2A and 2B respectively show a cross-sectional side view of the panel through plane IIA of FIG. 1A, and a detail thereof, and FIGS. 2C, 2D, and 2E respectively show cross-sectional side views of one or more embodiments of the panel according to the present invention;

FIG. 3 shows a partial longitudinal sectional view of the panel through plane P2;

FIG. 4 schematically shows a system according to the present invention;

FIG. 5 shows a template as may be used in the system of the present invention;

FIG. 6 schematically shows a substrate dispensing device as may be used and/or may be part of in the system of the present invention; and FIGS. 7A-7C each schematically show a top view of a respective metering device as may be used and/or may be part of in the system of the present invention.

DESCRIPTION OF EMBODIMENTS

FIG. 1A shows two panels, 1 and 1' of an identical construction, with panel 1 stacked on top of panel 1'. Along their longitudinal direction X the panels have a length I of about 1200 mm and the panels each have a width w of about 400 mm. Each panel is substantially made from a foamed polystyrene material, though any other material which is lighter than water and provides the panel with the capacity to float can be used as well or instead. At its top side 2 the panel 1 is provided with grooves 10-16, which extend over the entire length of the panel. The grooves are all substantially completely filled with a substrate S for supporting the growth of plants or precursors thereof in the substrate. For allowing exchange of air to roots of plants held in the grooves when the panel is floating on the water, through openings 43 are provided which extend from the top side to a bottom side of the panel, as will be described in more detail with reference to FIG. 1B.

At the longitudinal peripheral edges of the top side 2, the panel comprises planar stacking surfaces 30, 31, 32. The stacking surfaces 30 and 31 and the stacking surfaces 31 and 32 merge into respective ramps 33 which have a substantially planar top surface which extends below the top edges of the grooves 10-16. On a bottom side the panel 1 comprises legs 4 which, in the stacked configuration shown, rest with their distal ends 5 on the corresponding stacking surfaces of the lower panel 1'. When the panel 1 is moved along direction X relative to panel 1', sliding contact of the legs 4 of panel 1 with the ramps 33 of panel 1' cause panel 1 to be lifted up and away from plants that may have germinated in the grooves of panel 1'. Damage to such plants due to shearing movement between panel 1 and panel 1' is thus substantially avoided. The legs 4 are provided with recessed portions 6, which allow air to flow from outside the stack into and out of the space between a lower side of the panel 1 and the upper side of panel 1'. When a number of these panels is stacked in a germination room in this manner, air can freely flow across the plants or precursors thereof during germination.

FIG. 1B shows a partial bottom view of the panel 1. The panel comprises a number of air chambers in which the grooves 10-16 debouch. For instance, on the right hand side grooves 10 and 11 debouch in air chamber 40a, grooves 12, 13 and 14 debouch in air chamber 40b, and grooves 15 and 16 debouch in air chamber 40c. Air openings 43 extend from the top side 2 to within each air chamber at a location spaced apart from the grooves, here at locations between two adjacent grooves. Thus, even when the grooves are filled with substrate, air can be exchanged between the top side of the panel and the air chambers.

In the embodiment shown each groove debouches into multiple air chambers which are separated from each other by reinforcement ribs 60 which extend perpendicular to the grooves and increase the structural strength of the panel. However, depending on the length of the panel and on the materials used, such reinforcement ribs 60 may not be necessary, in which case each groove could debouch into only a single air chamber.

FIG. 2A shows a cross-sectional side view of panel 1 through plane II-A of FIG. 1A. The top side 2 of the panel lies substantially in a first plane P1, and no part extends from said top side beyond the first plane P1. Both the ramps 33 and stacking surfaces 31 are arranged below plane P1. Grooves 10-16 extend from the first plane P1, through part of the panel 1 to a second plane P2 where they debouch in the air chambers 40a, 40b, 40c.

FIG. 2B shows a detail of the panel near air chamber 40c in FIG. 2A, but without substrate being provided in the grooves 15, 16. Groove 16 is provided with facing side support surfaces 20,21 which extend parallel to the groove 16 and which taper towards each other in a direction from the first plane P1 towards the second plane P2. At their edges closest to the first plane P1, the side support surfaces 20,21 respectively merge into walls 22, 23 which extend parallel to the longitudinal direction of the grooves and normal to the first plane P1. At their lower edges furthest from the first plane P1, the grooves 15, 16 debouch in a ceiling of the air chamber 40c. Spaced apart from where the grooves debouch into the ceiling, e.g. at least by a distance of 0.3 cm or more along second plane P2, the chamber 40a comprises a circumferential side wall 42 into which the ceiling 41 merges. The circumferential side wall 42 has a distal edge 44 at a distance equal to or greater than distance d2 from the second plane P2, so that when the panel floats on the water the circumferential edge at least reaches the water surface W. In this manner it is avoided that the roots of plants or precursors formed in the air chambers are subjected to draft or other substantially horizontally directed flows of air within the air chambers, which generally are detrimental to the air roots. It will be appreciated that the depth to which the circumferential edge extends into the water differs depending on the weight of the plants and substrate supported by the panel. However, this weight can generally be predicted to within useful ranges. For instance the grooves of a 1200 mm×400 mm raft may be filled with substrate and plants or the precursors thereof weighing about 2.5 kg in total. During growth of the plants they will absorb some of the substrate, so that the loss in weight of substrate is compensated by a gain in weight of the plants. Though the plants may also absorb water and nutrients from the air, this does not result in a gain in weight of the plants which causes the substrate to contact the water surface W. Generally, during growth of the plants while the panel is floating on the water, the ceiling will remain at least 2.5 cm spaced apart from the water surface W. The distal ends 5 of legs 4 extend deeper into the water than the edge 44.

Within air chamber 40c an inner circumferential wall 50c is provided, which is extends from the ceiling 41 and is circumferentially spaced apart from circumferential wall 42. The inner circumferential wall 50c further limits draft within the air chamber, while allowing exchange of air from a position below groove 15 to a position below groove 16 and vice versa. Additionally, the inner circumferential wall, which is formed by the outer surface of a foamed block 51, improves the buoyancy of the panel.

FIG. 2C schematically shows a cross-sectional view of a panel 91, in which like reference numerals refer to like elements as described with respect to FIGS. 2A and 2B. Substantially the entire top side 2 of the panel 91, as well as the side support surfaces 20,21 and the side walls 22,23 of each of the grooves are provided with a water tight coating 81. This coating allows easy cleaning of the top side 2 and upward facing portions of the grooves of the panel. Additionally, the coating 81 forms a barrier which prevents moisture from seeping from the water side of the panel, through the panel 91 from to the top side 2 where the moisture might come into contact with leaves of the plant and cause these to rot. Foamed block 51 of the panel may thus be made from a material that is permeable to moisture, e.g. from a relatively low density material such as polyurethane foam, while the coating 81 may be made from a liquid and/or gas-tight material, such as polyethylene or polypropylene, for substantially preventing moisture from coming into contact with leafs of plants at the top side 2. The coating does 81 not need to extend below plane P2 where the roots of the plants or precursors thereof may be subjected to moist air. Due to the shape of the grooves 15,16, the ceiling 41 and the air chambers 40c contact between the roots and any portion of the panel between plane P2 and the water line W is substantially prevented.

The side support surfaces 20,21 of groove 15 each extend at an inner angle α1, α2 of about 70 degrees to a plane N which extends between the side support surfaces 20,21 in a direction parallel to the groove 15 and normal to plane P1. Though in FIG. 2C the ceiling 41 is shown to be parallel to plane P2, it may alternatively extend at an angle β of up 20 degrees to said plane, on either side of the plane P2 in the vicinity to where the groove debouches into the air chamber 40c.

FIG. 2D schematically shows a cross-sectional view of a panel 92, in which again like reference numerals refer to like elements as described with respect to FIGS. 2A and 2B. Here, substantially the entire outer surface of the panel 92 is covered with a water tight coating 82.

FIG. 2E schematically shows a cross-sectional view of a panel 93 according to another embodiment of the invention. The panel comprises a top part 70 and a bottom part 71 detachably supported thereon. The top part is made from a relatively dense material, in the example shown a food grade high density polyethylene (HDPE) having a density of about 0.95 gr/cm$^3$, that is impermeable to water, providing a top part that is easy to clean and/or sterilize. The bottom part 71 is made from a different, relatively less dense, material, in the example expanded polyethylene, than the top part 70. The relatively less dense bottom part improves the buoyancy of the panel 93 but does not need to be as impermeable to water as the top part. Generally the density of the top part is at least 1,3 times larger than the density of the bottom part, and the top part may even have a density greater than 1 gr/cm$^3$ whereas the bottom part typically has a density of less than 0.7 gr/cm$^3$.

The top part is connected to the bottom part by a pin and socket connection comprising pins 76 of the bottom part which fit in corresponding sockets 74 of the top part 70. The pin-and-socket connection allows the top part to be lifted from the bottom part 71 in a direction normal to plane P1, while preventing relative movement between the two parts in a direction parallel to the plane P1. The top part may thus easily be cleaned separate from bottom part.

FIG. 3 schematically shows a cross-section of the panel through a plane parallel to and just below the second plane P2. The air chamber 40c is delimited on an outer side by the circumferential side wall 42c, and on an inner side by inner circumferential wall 50c of the block 51. Though not shown in FIG. 3, grooves 16 and 15 debouch into the air chamber 40c. Air chamber 40b, into which grooves 12, 13 and 14 debouch, comprises a circumferential side wall 42b, as well as two inner circumferential side walls 50b1, 50b2, both of which are circumferentially spaced apart from the side wall 42b and from each other. Air chamber 40 comprises a circumferential side wall 42a within which a single inner circumferential wall 50a is arranged at a distance therefrom.

FIG. 4 schematically shows a system 100 according to the invention, comprising a conveyor 104 on which a panel 101 as described herein is placed with its grooves already filled with substrate. The conveyor, which is attached to a frame 102, is adapted for moving the panel 101 along the longitudinal direction L of the panel below a metering device 103, which is rotatably attached to the frame 102 and adapted for depositing plants or the precursors thereof in the substrate each groove. Once the plants or precursors thereof have been deposited, the panel is moved further until it is contacted by a roller 105, or compacting device, which compresses the substrate in the grooves.

FIG. 5 shows a template as may be used during filling of the grooves with substrate and/or while the plants or precursors thereof are deposited in the grooves. The template 200 comprises protrusions 201 which are arranged for substantially completely blocking the grooves at the location where the grooves debouch into their corresponding air chambers, while leaving the grooves open at the top side of the panel. A FIG. 6 schematically shows a substrate dispensing device 300 as may be used in a system according to the invention, e.g. in the system of FIG. 4. The substrate filling device 300 is adapted for filling grooves 310 of a panel 301 according to the invention. The panel 301 is supported on a conveyor 304 which is arranged for transporting the panel below a hopper 309 which is filled with substrate S. The hopper is operable for depositing substrate on cover template 306 in order to fill the grooves of the panel with substrate. The cover template is arranged between the panel and the hopper for substantially preventing substrate from being deposited on the planar top side of the panel, while allowing substrate to pass through longitudinal openings 307 into the grooves 310 of the panel. In this manner, when substrate is deposited from the hopper onto the cover template, the substrate can pass into the grooves, while the remaining portion of the top side of the panel 301 remains substantially free from substrate and provides a clean surface on which leaves of plants grown in the panel may rest.

The longitudinal openings have substantially the same width as the corresponding grooves and are aligned with the grooves. The template 306, here is shown partially cut-away, is arranged above the panel at a distance of no more than 2 cm therefrom, and may even be supported on the panel 301. In the preferred embodiment shown, the longitudinal openings in the cover panel have a length substantially equal to the length of the panel, so that substrate can be distributed along the grooves while the panel and hopper are stationary to each other. However, in an alternative embodiment, the length of the longitudinal openings may be significantly smaller than the length of the panel, in which case the grooves can be filled with substrate along their entire length if the panel is moved relative to the hopper along its longitudinal direction.

FIGS. 7A-7B schematically show top views of metering devices as may be used in a system according to the invention.

FIG. 7A shows a metering device 400 comprising a single drum seeder 403 which extends along the width of a panel 401 comprising grooves 410-415. The panel 401, which is a panel according to the invention, e.g. as shown in FIG. 1A, is here shown schematically and along only a portion of its length. It will be understood that this panel 4011 has a length at least 10 times the width of the grooves. The drum seeder 403 rotates with a substantially constant angular velocity w1 and 403 is provided with a number holes 419 which corresponds to the number of grooves in the panel, for depositing seeds 425, 426, 427 in the grooves. A control module 408 controls the angular velocity at which the drum seeder rotates, as well as a linear transport velocity V of a conveyor 404 which conveys the panel 401 under the drum seeder 403. The combination of the angular velocity and linear velocity determines the distances a1, a2 at which consecutive seeds 425, 426, 427 are deposited in a same groove 410-412. For example, if the angular velocity is 50 rpm and the velocity V is 10 meters per minute, then consecutive plants or precursors thereof are deposited at 0.2 meters from each other within the same groove. The distance a0 in between two plants or precursors thereof 426,427 in adjacent grooves 410 and 411, 411 and 412, etc. depends on the distance between the adjacent grooves.

FIG. 7B schematically shows a top view of another embodiment of a metering device as may be used in a system according to the invention, in which panel 401 is shown along only a portion of its length. The metering device 500 comprises two parallel drum seeders 503*a*, 503*b* which are placed spaced apart from each other along the longitudinal direction of panel 401. A control module 508 controls the drum seeders 503*a*, 503*b* to rotate with respective substantially constant but different angular velocities w1, w2. Each drum seeder 503*a*,503 comprise a single hole 519*a*, 519*b* for each groove, from which to deposit a seed 525, 526, 527 in the corresponding groove 510-515. The control module 508 further controls the linear transport velocity V with which conveyor 504 transports the panel 401 underneath the drum seeders. As the drum seeders 503*a*, 503*b* are spaced apart from each other and rotate at different speeds, seeds in the set of odd-numbered grooves 411, 413, 413 are spaced apart, within the same groove, at different distances than seeds in the set of even-numbered grooves 410, 412, 414. Besides varying the distances between seeds in two sets of grooves, this embodiment also allows a variation in distance a0 between seeds in adjacent grooves.

FIG. 7C schematically shows a top view of yet another embodiment of a metering device as may be used in a system according to the invention, in which the panel 401 is shown along only a portion of its length. The metering device 600 comprises a plurality of disc seeders 603*a*, 603*b*, 603*c*, 603*d*, 603*e*, 603*f*, each of which is provided with a number of holes 619*a*, 619*b*, 619*c* from which seeds 625, 626, 627 are to be deposited into one of the grooves 410-415. The panel 401 is moved conveyor 604 underneath the metering device with a linear transport velocity V. The disc seeders 603*a*, 603*b*, 603*c* and so on rotate with respective angular velocities w1, w2, w3, wherein the angular velocity of each disc seeder is individually controlled by control module 608. By varying the angular velocities w1, w2, w3, the distances a1, a2, a3 between adjacent seeds 625, 626, 627 within a corresponding groove 410, 411, 412 can be varied. This allows seeds of plants or precursors thereof, such as Arugula (*Eruca sativa*) and babyleaf (*Lactuca sativa*) seeds, to be deposited on the same panel at distances which depend on the type of plant variety of the seed.

As the seed dispensing rate of each of the disc seeders is individually controllable by the controller, seeds can be deposited in the grooves in any desirable pattern. As the grooves of the panel 401 extend over the entire length of the panel, a number of abutting panels may be placed in series, with the substrate in the grooves of adjacent panels forming a substantially continuous body of substrate in which the seeds can be deposited. The present invention has been described above with reference to a number of exemplary embodiments as shown in the drawings. Modifications and alternative implementations of some parts or elements are possible, and are included in the scope of protection as defined in the appended claims.

The invention claimed is:

1. A stackable panel for floating cultivation of plants on water, said stackable panel comprising:
a plurality of parallel grooves at a top side of said stackable panel which extend in a longitudinal direction of the stackable panel and are configured to receive therein a substrate and a plurality of plants or precursors thereof in the substrate, a length of each of the grooves at the top side being at least 10 times the width of the respective groove, each of the grooves extending through the panel from a first plane at said top side to a second plane parallel to and spaced apart from said first plane; and
a plurality of air chambers at a lower side of the panel which extend below the grooves to said lower side, each of said air chambers being configured to allow therein a formation of air roots of plants or precursors thereof which are supported in the substrate of one or more of said grooves, each of said air chambers having a circumferential side wall delimiting said respective chamber from the other air chambers and a circumferential bottom edge configured to extend into the water when the panel floats on the water,
wherein, at said second plane, each of the grooves debouches into one of said air chambers, each of said grooves comprising at least two side support surfaces which extend parallel to the respective groove and below the top side, said side support surfaces being configured to support the substrate in the respective groove.

2. The panel according to claim 1, wherein each of the grooves is spaced apart from the circumferential side wall of the air chamber into which the respective groove debouches.

3. The panel according to claim 1, wherein each of said air chambers is configured to receive therein air roots from the plants or precursors thereof which are supported in the substrate of two or more of said grooves.

4. The panel according to claim 1, wherein said side support surfaces face each other and taper towards each other in a direction from the first plane towards the second plane where the groove debouches into the air chamber.

5. The panel according to claim 1, wherein said side support surfaces face each other and each extend from just below the first plane to the second plane.

6. The panel according to claim 1, wherein each of said grooves has a width of between 0.3 cm and 3 cm.

7. The panel according to claim 1, wherein the grooves are configured to be filled by the substrate and the plurality of plants or precursors in the substrate.

8. The panel according to claim 1, further comprising a plurality of legs at the lower side of the panel, each of the legs having a distal end configured to be submerged in the water at a first distance from said second plane in a direction normal to said second plane.

9. The panel according to claim 8, wherein said circumferential side wall has a circumferential distal edge at a second distance from said second plane in the direction normal to said second plane, said second distance being smaller than said first distance.

10. The panel according to claim 1, further comprising stacking surfaces disposed at the top side and below the first plane, the stacking surfaces being configured to support thereon legs of another panel of a same construction, said stacking surfaces merging into ramps which project further towards said first plane than the support surfaces.

11. The panel according to claim 1, wherein said grooves, at least at the top side of the panel, extend over the entire length of the panel.

12. The panel according to claim 8, wherein the legs comprise one or more of: (i) openings and (ii) recessed portions configured to allow air to flow through said one or more of: (i) the openings and (ii) said recessed portions into and out of the air chambers of the panel when the panel is stacked on another panel of a same construction.

13. The panel according to claim 1, further comprising:
a top part comprising the top side and the side support surfaces of the grooves, the top side, the side support surfaces, and any portions of the top part between the top side and the side support surfaces are impermeable to air and water; and
a bottom part connected to said top part and comprising the circumferential side walls of the air chambers, wherein the density of the bottom part is at least 1.5 times less than the density of the top part.

14. The panel according to claim 1, wherein the top side, the side support surfaces of the grooves, and any portions of the panel between the top side and the side support surfaces, are completely coated with a coating that is impermeable to air and water.

15. The panel according to claim 14, wherein the panel is coated with a coating that is impermeable to air and water.

16. The panel according to claim 1, wherein a plane normal to the first plane extends between the two side support surfaces of each of the grooves and is parallel to the respective groove,
wherein an inner angle between each of said side support surfaces and said plane is in a range of 60 to 80 degrees.

17. A system for placing the plants or the precursors thereof in the panel according to claim 1, the system comprising:
a frame;
a conveyor attached to said frame and configured to move the panel in the longitudinal direction thereof relative to the frame; and
a metering device for the plants or the precursors thereof, the metering device being mounted on the frame and disposed above the conveyor, the metering device being configured to dispense said plants or the precursors thereof in the grooves of said panel during movement of the panel relative to the frame.

18. The system according to claim 17, further comprising a substrate dispensing device configured to fill said grooves of the panel with the substrate from the top side of the panel.

19. The system according to claim 18, further comprising a template on which the panel is to be placed during filling of the grooves, the template comprising protrusions configured to close off a bottom side of said grooves to prevent the substrate from falling through the grooves during said filling.

20. The system according to claim 18, further comprising a cover template configured to cover the top side of the panel except for the grooves thereof during filling of the grooves with substrate,
wherein, at least during said filling, the cover template is disposed below the substrate dispensing device.

21. The system according to claim 18, further comprising a compacting device configured to press down on the substrate in the grooves when the grooves are filled with the substrate.

22. The system according to claim 17, wherein the metering device is configured to dispense the plants or the precursors thereof at an adjustable rate, in order to dispense the plants or the precursors at corresponding adjustable distances from each other in one of the grooves of the panel.

23. The system according to claim 17, wherein the grooves of the panel are partitioned into two or more sets of grooves, and a dispensing rate of the metering device is individually configurable for each set of grooves.

24. The system according to claim 23, wherein the metering device comprises a plurality of dispensers, each of the dispensers is configured to dispense the plants or the precursors thereof in the grooves of one of the sets, the dispensing rate for each of the dispensers is independently adjustable of the dispensing rates of the other dispensers, and
the system further comprises a controller configured to individually control the dispensing rate of each of the dispensers.

25. The system according to claim 17, wherein a dispensing rate of the metering device is individually configurable for each of the grooves.

26. A method of cultivating plants using two or more panels according to claim 1, the method comprising:
filling empty grooves of each of the two or more panels with the substrate and the plants or the precursors thereof;
subsequently arranging said two or more panels on a body of water in order to allow the formation of the air roots from the plants or the precursors thereof in the air chambers of the panels; and
after said air roots reach the body of water, removing the two or more panels from the body of water and stacking the two or more panels on top of each other such that the plants or the precursors thereof disposed in the grooves of one of said two or more panels germinate and extend into an air chamber of another panel of said two or more panels which is stacked directly on said one panel.

27. The method according to claim 26, wherein, during filling of the grooves with the plants and the precursors thereof, the panels are disposed abutting each other along a longitudinal direction of the panels.

28. The method according to claim 26, wherein the grooves of the panel are partitioned into two or more sets of grooves, and a dispensing rate of a metering device is individually configurable for each set of grooves, and
wherein said filling the empty grooves of each of the panels with the substrate and the plants or the precursors thereof comprises:
filling the grooves of the panel with the substrate, and dispensing the plants or the precursors thereof in the grooves while conveying the panel under the metering device along a longitudinal direction of the panel, the metering device comprising an individual dispenser for each set of the two or more sets of grooves, the dispensing rate at which a first individual dispenser of said individual dispensers dispenses the plants or the precursors thereof in the grooves associated with the first individual dispenser differs from the dispensing rate at which a different, second one of said individual dispensers dispenses the plants or the precursors thereof in grooves associated with the different, second one of the individual dispensers.

* * * * *